Nov. 17, 1931.   C. H. ZIMMERMAN   1,832,802
TIRE REPAIR
Filed April 16, 1929
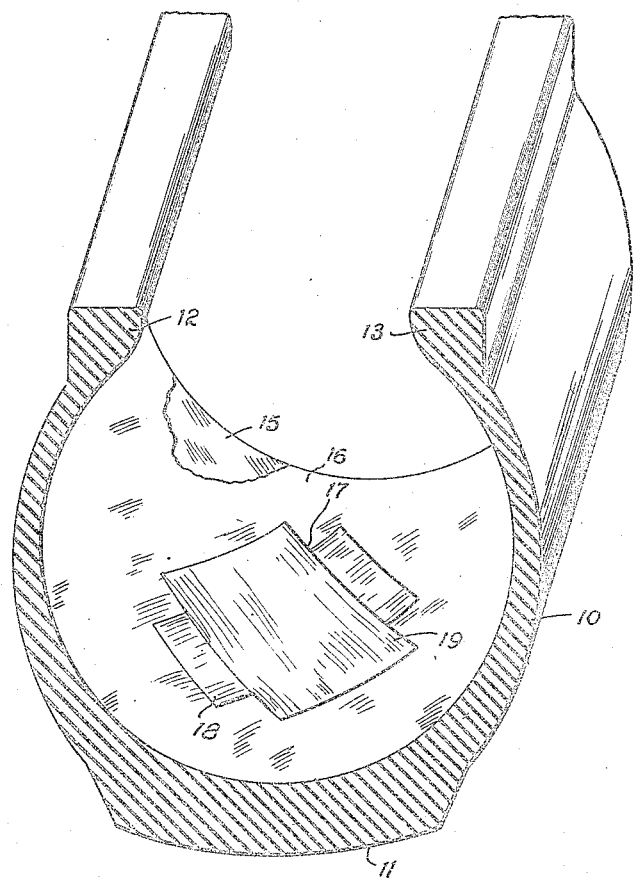
Inventor
Charles H. Zimmerman Patented Nov. 17, 1931

1,832,802

UNITED STATES PATENT OFFICE

CHARLES H. ZIMMERMAN, OF AKRON, OHIO, ASSIGNOR TO THE GOODYEAR TIRE & RUBBER COMPANY, OF AKRON, OHIO, A CORPORATION OF OHIO

TIRE REPAIR

Application filed April 16, 1929. Serial No. 355,466.

This invention relates to pneumatic tires and it has particular relation to repairs adapted for employment in conjunction with tires that have been injured while in service.

The object of the invention is to provide a repair for an injured pneumatic tire which is so related to the tire that it will effectively absorb the stresses set up in the injured portion instead of allowing the latter to be further damaged by such stresses.

The repairing of a pneumatic tire that has been injured is of great importance because it has for an objective the prolongation of the life of a tire which otherwise might be discarded. A capable repair will prolong the life of an injured tire many hundreds of miles. For this reason the question of repairing tires has been one of prominence in the tire industry. Various repairs have been provided but so far as known, they have all pertained to the form of the repair or the manner of applying it to the casing. Little, if any, attention has been given the question of combining repairs of one kind of fabric with tire casings composed of a different kind of fabric. The relation of the strengths and elasticities of the fabrics employed in the tire casing and the repair has not been subjected to analysis.

According to present practice, it is customary to repair tires with new cord fabric, the cords of which are similar in construction to those comprising the tire casing. However, it has been determined that the fabric in a tire casing loses a considerable percentage of its elastic and tensile properties during the use thereof under actual operating conditions. Hence, when a repair for a worn tire casing was composed of fabric having elastic and tensile properties similar to the original elastic and tensile properties of the fabric in the casing, the tensile and elastic properties of the fabric in the casing and in the repair varied considerably. As a result, during operation of the tire, the cords adjacent the injured portion of the casing were not relieved of the stresses imposed adjacent the injury because most of the stresses would be absorbed before the cords in the repair could be stretched sufficiently to relieve them. The injured cords soon wore out under such operating conditions and the tire failed adjacent thereto, while the repair fabric usually remained in good condition.

According to this invention, it is proposed to repair injured tire casings with cord fabric having elastic properties similar to the elastic properties of the cords in the worn casing. By providing such a repair, a major portion of the stresses imposed upon the tire casing adjacent the injured portion are absorbed by the repair. Thus, the repair may be employed effectively to accomplish the purpose for which it is applied.

For a better understanding of the invention, reference may now be had to the accompanying drawing, forming a part of the specification, the one figure of which is a fragmentary perspective view of a portion of a tire having its beads expanded for the sake of clearness, illustrating a tire repair in which the principles of this invention may be embodied.

In practicing the invention, an ordinary tire casing 10 is provided having a tread portion 11 and beads 12 and 13. The carcass of the tire or that portion composed of fabric, comprises a plurality of layers of cord fabric as indicated at 15 and 16, the cords in one ply being disposed transversely with respect to the cords of an adjacent ply. The cords in all of the plies are directed preferably at an angle of 45° to the beads 12 and 13. A patch 17, disposed on the inner ply 16 of the casing, is composed of crossed layers of cord fabric 18 and 19, with the cords in the layers preferably disposed parallel to the cords of the plies 16 and 15 respectively of the tire casing. It is, of course, understood that the tire is composed of more than two layers of cord fabric and that the repair 17 may be composed of more than two plies of cord fabric.

The cords of the repair 17 preferably have an elasticity approximately equal to the elasticity of the cords in the worn casing. Also, it is desirable that the cords in the repair have as great a tensile strength as is possible while still retaining the aforesaid relatively low elastic properties. However, the elasticity of the cords in the repair should be sufficient to withstand the normal stresses set up in the tire during operation of the latter.

As a specific illustration of the invention, let it be assumed that the tire carcass is composed of cord fabric having an elastic limit, when stretched, ranging from at least 21% to 28%; that is, the cords are capable of stretching 21% to 28% of their original unit length before breaking, and then returning to their original length. Such fabric may be composed of cords of 23's/5/3 construction or similar thereto, having an elastic limit, when stretched, of 28% as is specifically illustrated and described in the patent to Samuel A. Steere, No. 1,632,201, issued June 14, 1927. When the tire is considerably worn, the elastic limit of the cords will be found to be approximately 14% or one half of the original elastic limit. In order to provide a repair having elastic properties similar to the last mentioned percentage, it has been found desirable to employ a fabric composed of cords of 6's/4 construction. These cords originally have an elastic limit, when stretched, of about 13% which is approximately the same or slightly less than that of the cords of 23's/5/3 construction in a worn tire. When a repair composed of fabric of the latter construction is disposed on a worn tire composed of 23's/5/3 cord construction, it is evident that the cords in the tire casing, even though worn, have a slightly greater elasticity than the cords in the repair. Hence, when the injured portion of the casing is subjected to stresses, the cords in the repair absorb at least most of the stresses instead of allowing them to affect the cords adjacent the injury. This prevents damage to the cords in the casing adjacent the injury and further failure of the injured portion. Actual tests indicate that when a tire is repaired in this manner, its life, as compared to the life of a tire following the application of a repair according to the prior practice of repairing, is increased as much as 900%. Thus the potential life of a new tire is increased considerably when it is remembered that injuries frequently cause premature failure thereof.

Apparently the fabric in the tire casing and that composing the repair may vary considerably as long as the elasticity of the repair is not substantially greater, or is less, than the elasticity of the cords in the worn casing.

Reference has been made to cords of 23's/5/3 and cords of 6's/4 construction, and it is desired to state what this cord indicia means. A cord of 23's/5/3 is one wherein the size of yarn is represented by the numeral "23". Five of these yarns are twisted to form a strand, as indicated by the numeral "5". Three strands are twisted to form a cord as indicated by the numeral "3". In cords of 6's/4 construction, the size of yarn is indicated by the numeral "6". Four of such yarns are twisted to form a cord as indicated by the numeral "4". A cord of 23's/5/3 construction is illustrated in Patent No. 1,632,201. A cord of 6's/4 construction is similar in appearance to the ordinary cotton cord employed in merchandising business for tying packages.

From the foregoing description, it is apparent that in a repair constructed of cords having an elasticity less than or substantially equal to the cords in the worn casing, a major portion of the stresses are borne by the repair instead of by the cords in the casing adjacent the point of injury. As a result, cords adjacent the injury will be prevented from failing and thus enlarging the latter. It follows that the life of a tire that has been injured is increased considerably.

Although I have illustrated but the preferred form of the invention and have described that form in detail, it is apparent to those skilled in the art that it is not so limited but that various modifications may be made therein without departing from the spirit of the invention or from the scope of the appended claims.

What I claim is:

1. The combination with an injured tire casing comprising assembled layers of cord fabric, of a repair for the injured portion of the casing, comprising new cord fabric vulcanized to the casing over the injured portion, wherein the cords of the repair have an elasticity substantially equal to the elasticity of the cords in the casing.

2. The combination with an injured tire casing comprising layers of cord fabric of 23's/5/3 construction, of a repair for the injured portion of the casing, comprising new cord fabric of 6's/4 construction, the elasticity of the cords in the repair being substantially less than the original elasticity of the cords in the casing.

3. The combination with an injured tire casing comprising assembled layers of cord fabric, and of a repair for the injured portion of the casing, comprising new cord fabric vulcanized to the casing over the injured portion, wherein the cords of the repair have an elasticity substantially less than the original elasticity of the cords in the tire casing.

In witness whereof, I have hereunto signed my name.

Signed at Akron, in the county of Summit and State of Ohio, U. S. A., this 15th day of April, 1929.

CHARLES H. ZIMMERMAN.